Oct. 21, 1941.  C. M. EASON  2,259,461
CLUTCH
Filed April 27, 1939  2 Sheets-Sheet 1

Inventor:
Clarence M. Eason
By [signature]
Att'ys

Oct. 21, 1941.  C. M. EASON  2,259,461

CLUTCH

Filed April 27, 1939 2 Sheets-Sheet 2

Inventor:
Clarence M. Eason
By Brown Jackson Boettcher Dienner
Att'ys

Patented Oct. 21, 1941

2,259,461

UNITED STATES PATENT OFFICE 2,259,461

CLUTCH

Clarence M. Eason, Waukesha, Wis.

Application April 27, 1939, Serial No. 270,283

15 Claims. (Cl. 192—68)

This application is a continuation-in-part of my copending application Serial No. 245,601, filed December 14, 1938.

The present invention relates to friction clutches of the disc or plate type used for controlling the transmission of power from a driving member to a driven member, and more particularly this invention is concerned with clutches having a flexibly connected part accommodating a greater amount of misalignment than heretofore. In most clutches usually one part is connected to one of the dirving or driven members and the other clutch part is connected with the other member. When the clutch is engaged, the parts are held tightly together, and where the driving and driven members are out of accurate alignment with each other during operation, constant slippage will occur between the clutch parts unless one clutch part is connected to its associated member by flexible means which permits both clutch parts, when engaged, to move together with one of the driving or driven members, all relative movement due to any misalignment taking place in the flexible connecting means.

One of the clutches of this type which has proved satisfactory for operation under conditions of misalignment is shown in my prior Patent No. 2,177,362, issued October 24, 1939, to which reference may be had if desired, and, in general, consists of a clutch disc having flexible circumferentially extending fingers, each connected at its inner end to the clutch disc and at its outer end to the associated driving or driven member. The clutch disc is thus flexibly connected therewith and can accommodate a greater amount of misalignment, particularly angular misalignment between the axes of rotation of the members, than any other prior clutch of this type.

It is the object and general nature of this invention to provide a clutch disc which embodies certain improvements over the construction shown in my above mentioned prior Patent No. 2,177,362. One feature of this invention is the provision of a clutch disc formed generally of flat sheet or strip stock and having flexible attaching fingers each constructed with a greater degree of curvature than the curvature of the periphery or circumference of the disc proper at the point where the finger is connected to the clutch disc. This construction results in a much greater longitudinal extensibility of each finger; that is, the distance for each finger between the point of attachment at its outer end to the associated member and its point of attachment to the clutch disc itself may vary, so as to secure the desired flexible attachment, more widely than heretofore. More specifically, it is a feature of this invention to provide longitudinally extensible attaching fingers in which the major portion of the finger lies entirely outside a straight line connecting said points of attachment, which line is generally tangent to the disc proper at the point where the finger is connected to the clutch disc.

Another feature of this invention is the provision of a clutch disc or plate in the form of a plurality of segments each with a flexible attaching finger and each having the grain of the metal running the same general direction, preferably longitudinally of the fingers, whereby the characteristics of all of the attaching fingers, particularly as concerns their resilience and flexibility, are the same. In clutch discs, such as the one disclosed in my last mentioned copending application, where the entire disc and fingers are formed in one piece, it will be seen that in some fingers the grain of the metal runs longitudinally, while in others the grain runs transversely. There is therefore some variation in the flexibility and extensibility of the several fingers, which is avoided by the present invention.

These and other objects and advantages of the present invention will be apparent to those skilled in the art after a consideration of the following detailed description of the preferred embodiment of my invention, taken in conjunction with the accompanying drawings, in which.

Figure 1:
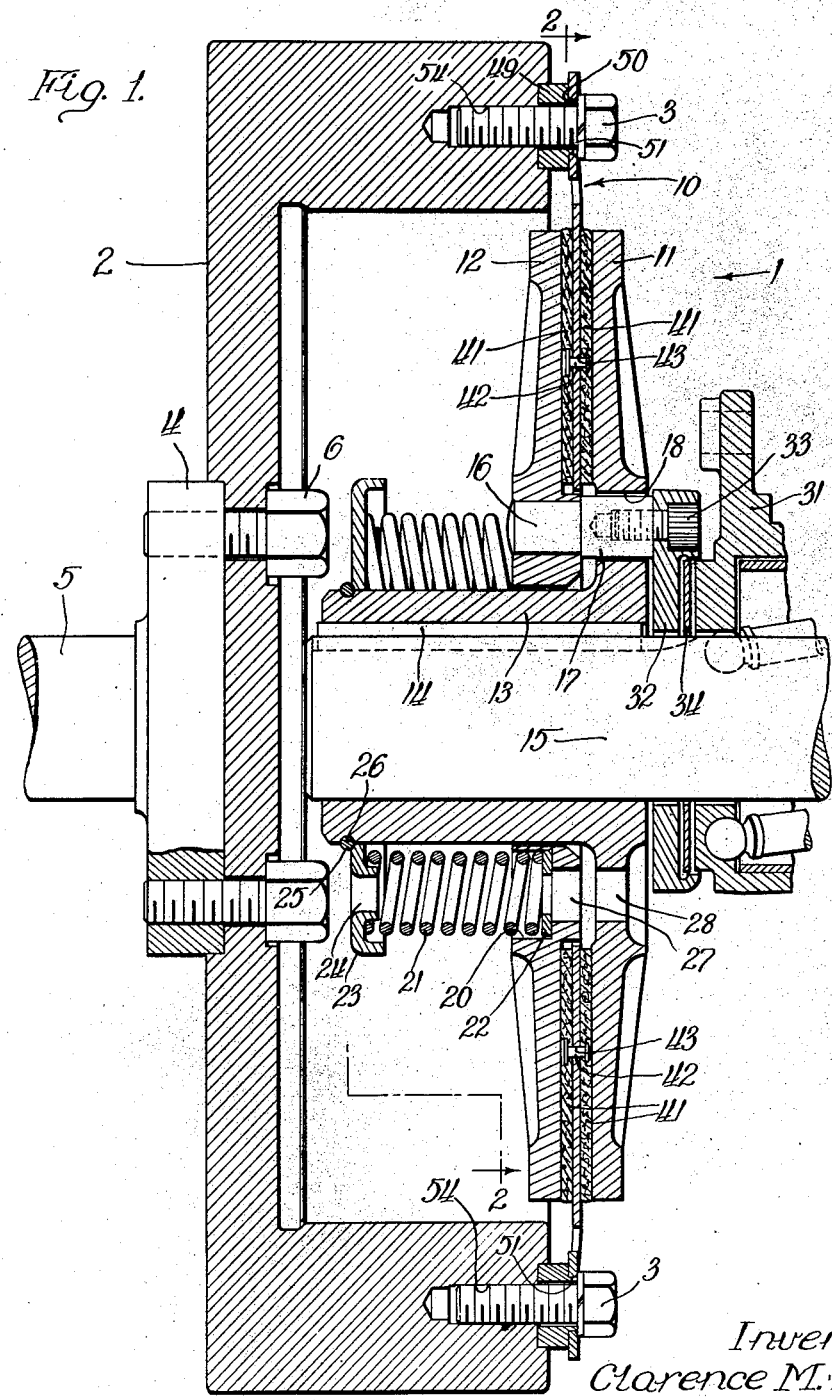
Figure 1 is an axial section taken along the line 1—1 of Figure 2, showing a clutch embodying the present invention.

Referring now to Figure 1, the clutch 1 is adapted to be secured to the flywheel 2 of a motor by stud bolts 3. The flywheel 2 is secured to the flange 4 of the motor crankshaft 5 by stud bolts 6. The clutch 1 includes a driving clutch disc 10, described below in detail, disposed between a pair of driven clutch plates 11 and 12. The clutch plate 11 has an integral hub 13 secured by a key 14 to a driven shaft 15, which may be supported for rotation on and form a part of the machine (not shown) to be driven by the motor. The other clutch plate 12 is disposed about the hub 13 and has a plurality of shouldered studs 16 fixed thereto.

The larger ends 17 of the studs 16 are slidably received in openings 18 formed in the plate 11 near the hub 13. The studs 16 thus support the plate 12 for movement toward and away from the fixed plate 11. The plate 12 has a number of recesses 20 in each of which one end of a spring 21 is seated against an apertured insulating washer 22. The other end of each spring seats against a collar 23 which has a plurality of flanged openings 24, the flange of each of which centers the associated spring 21. A snap ring 25 seats in a groove 26 and holds the collar 23 on the hub 13. A hole 27 extends through the plate 12 from the bottom of each recess and is in line with a hole 28 in the plate 11. The circulation of air through the washer 23 and the registering holes 27 and 28 keeps the springs 21 from overheating in operation. The clutch plate 12 is shifted by means of an axially movable member 31 bearing against a plate 32 secured by cap screws 33 to the outer ends 17 of the pins 16. An anti-friction thrust ring 34 is disposed between the member 31 and the plate 32.

The present invention is not to be limited to shifting mechanism just described, for any suitable shifting means may be used to engage and disengage the clutch, as desired.

Figure 2:
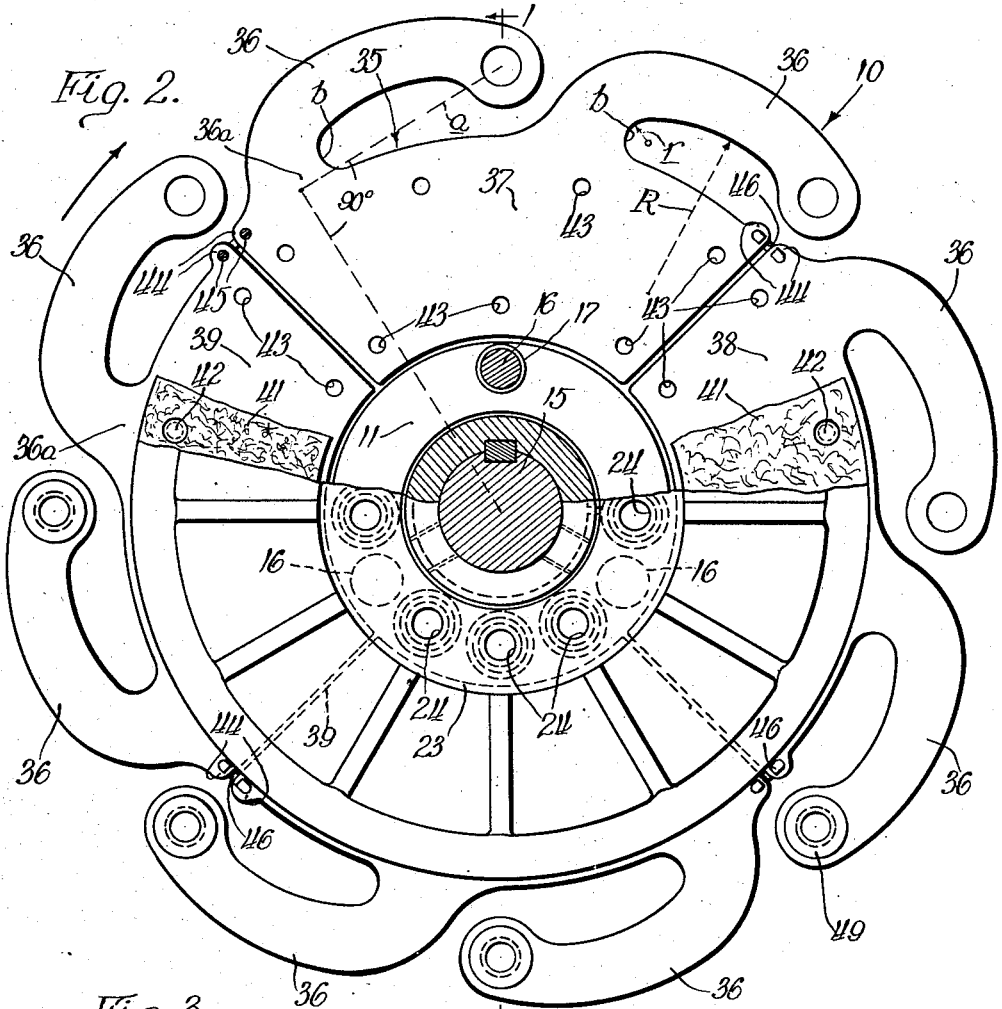
Figure 2 is a view of the clutch taken generally along the line 2—2 of Figure 1, showing particularly the clutch disc.

The driving clutch disc 10, as best shown in Figure 2, comprises generally an inner disc or plate section 35, constituting the clutch disc proper, and a plurality of generally circumferentially directed attaching fingers 36. The disc section 35 consists of a number of segmental parts 37, 38, 39, etc., each having two attaching fingers 36. Also, the opposite faces of each segmental part carry clutch lining 41 of any suitable material secured thereto by rivets 42, which are inserted through holes 43 in the clutch segment. As shown in Figure 2, the segments 37, 38, 39, etc. are four in number and spaced apart only a small amount at their adjacent edges, so that when assembled, as shown, the segments taken together form the clutch disc 35. Each segment has lugs 44 at its radially outer corners, just outside the circumference of the clutch disc 35, and each lug 44 has a hole 45 drilled therein. Adjacent holes receive small staples or clips 46 formed of wire or the like which hold the assembled segments together for handling as a unit during the attachment of the clutch to the flywheel 2 or other part, and which also hold the segments together when in operation.

The fingers 36 preferably are formed integral with the associated disc segments, each finger being connected at one end, as at 36a, thereto and at the other end is apertured and carries a spacer 49 which has a reduced end 50 riveted in the opening 51 at the outer end of the finger. The flywheel 2 is drilled and tapped, as at 54, and receives the stud bolts 3 which pass through the bushings or spacers 49 and secure the outer or free ends of the fingers 36 to the flywheel. The arms or fingers 36 are in the nature of springs since they have the requisite resiliency, and while they are shown as connected integrally to the clutch disc, they may be made separately and secured thereto as desired.

The flywheel normally rotates in the direction of the arrow shown in Figure 2, so that the fingers 36 operate normally in tension in transmitting the driving force to the clutch disc 35 and through the latter and the driven plates 11 and 12 to the driven shaft 15. The fingers are flexible laterally of the plane of the disc and are also particularly formed to be extensible in a longitudinal direction and to be capable of a certain amount of deflection generally radially outwardly of the disc. To this end, each finger is formed as an arc having a radius R considerably shorter than the radius of the circumference of the clutch disc itself. The curvature of each finger is such that the larger portion of the body of the finger lies wholly outside of a line $a$ (Figure 2) connecting the center of the spacer 49 (the point of application of the driving force) and the point 36a (the point of application of the load) where the finger joins the disc, the length and position of the finger 36 being such that the line $a$ is generally a tangent at point 36a. This provides the most advantageous application of the driving force, and since practically all of the metal of each finger lies radially outwardly of the line $a$, each finger is extensible in the direction of the line $a$ to a much greater degree than would be the case if the line $a$ passed through metal for most of its length. In the one case extensibility is secured by the link tending to straighten out with somewhat of a bending action under the forces imposed thereon, but in the latter case the extensibility available is limited principally to the stretch in the metal itself.

The junction $b$ where the inner edge of each finger joins the disc proper is curved generally in an arc having a radius $r$ large enough to distribute the stresses over a considerable area when the finger is deflected generally radially outwardly away from the disc, and therefore the localization of stresses and possible failure at this point are prevented.

It will be understood that where the driven shaft 15 is in perfect axial alignment with the crank shaft 5 there is no flexing of the fingers in operation. It is not usual, however, that perfect alignment is retained for any length of time even if it was initially present. Under some conditions the axes of the driving and driven parts may intersect but with one axis at an angle with respect to the other, and in other cases the two axes may be parallel but one displaced axially relative to the other. Further, in still other cases, the axes may be both angularly misaligned and radially displaced. When the driving and driven members rotate together with the driving clutch disc proper clamped tightly between the two driven plates, the driving plate tends to move bodily with the driven parts of the assemblage, regardless of the position of the driving parts. It will be seen, therefore, that with any one of the above mentioned misalignments, each finger 36 goes through a cycle of flexing in different directions for each revolution of the driving and driven members. If, for example, the driving and driven members are merely angularly misaligned, resulting in the plane of rotation of the driving clutch disc being cocked relative to the plane of rotation of the portion of the driving flywheel 2 to which the outer ends of the fingers 36 are attached, when any one finger is at the top, it will be deflected in one direction, and when it is at the bottom it will be deflected in the opposite direction, both generally laterally with respect to the plane of the fingers. Further, each finger will also be deflected generally radially a slight amount in its upper and lower positions by virtue of the cocking of the plane of rotation of the disc relative to the flywheel, and likewise at points adjacent the axis about which the cocking takes place there is a slight variation in the distance 36a—49 as each finger moves from one side of the axis to the other. Similar deflections take place where the driving and driven parts are displaced radially, in which in the successive positions of each finger during one revolution it will be subjected to varying degrees of stretch longitudinally of itself.

The general curvature of each finger whereby, as pointed out above, the principal portion of each finger lies above or radially outwardly of the line extending generally tangentially from the point of connection of each finger to the flywheel to the point where the finger joins the clutch disc proper, secures an amount of longitudinal extensibility sufficient to accommodate a considerable degree of angular misalignment, as well as generally radial displacement, and the relatively large curvature, as indicated at b, serves to prevent any localization of the stresses at the points where the inner edge of each finger joins the clutch disc proper. Further, the length of each finger from its point of attachment, at 36a, to the disc to the bushing 49 is sufficient to provide the requisite lateral flexibility to accommodate a considerable axial displacement of the plane of rotation of the disc relative to the plane of rotation of the points on the flywheel where the outer ends of the fingers are bolted thereto. Where each finger thus passes successively through various positions and is flexed and distorted to various degrees when the driving and driven parts are misaligned, it will be seen that it is important to form the clutch disc so that all of the fingers have about the same degree of flexibility and extesibility. To this end, the present invention therefore contemplates manufacturing the clutch disc, not as one integral plate, but in the form of a plurality of segmental sections with the grain of the metal running substantially the same way in each resilient arm or finger, there being four segmental sections 37, 38, 39, and 40 as described above. The number of segments may, of course, vary. The several sections are arranged and assembled so that, taken together, they comprise the clutch disc by which power is transmitted from the driving to the driven elements.

When the clutch is assembled and connected between the driving and driven parts 2 and 15, the fixed clutch plate 11 is fixed to the shaft 15 in such a position that when the other clutch plate 12 is forced by the springs 21 into clamping engagement against the driving clutch disc and forces the latter against the inner surface of the plate 11, the resilient arms or fingers 36 are deflected a slight amount rearwardly or away from the flywheel 2. As will be obvious, this amount of deflection depends upon the position of the plate 11 and the thickness of the washers or bushings 49. The purpose of this arrangement is to bias the spring arms 36 so that they move the clutch disc proper out of engagement with the fixed driven clutch plate 11 when the clutch is released, thereby eliminating any possibility of the clutch dragging. Normally, the resilient arms or fingers 36 are disposed in the general plane of the disc proper.

It will be noted from Figure 1 that the general plane of the driving clutch disc 10 lies just outside the flywheel 2. Since the driving clutch disc is formed on a plurality of segments, each separately attached to the flywheel by the bolts 3 passing through the ends of the circumferentially directed fingers 36, it is possible by removing one segment at a time and replacing it with a new or reconditioned one to renew the clutch linings without disturbing or disconnecting the driving and driven parts. To do this, it is merely necessary to hold the clutch disengaged, as through the means 32, and then upon loosening and removing the cap screws or stud bolts 3 it is possible simply to lift out the clutch disc segment and secure another one in its place. Attaching the clutch disc fingers to the outer portion of the flywheel 2, in the manner shown in Figure 1, materially contributes to the accessibility of the attaching bolts 3 and therefore makes it feasible to renew the clutch in this manner. In cases where the clutch is disposed within the body of the flywheel itself, it is sometimes inconvenient, if not impossible, to reach the clutch disc or the attaching bolts.

Figure 3:
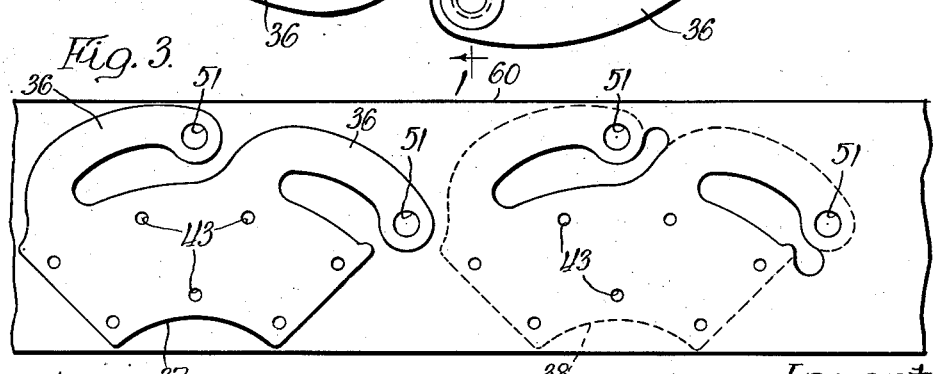
Figure 3 is a view showing the manner of forming the clutch disc segments from sheet metal stock in strip form.

Referring now to Figure 3, the reference numeral 60 indicates the strip of stock from which the clutch segments 37, 38, etc., are formed, the strip being of sheet metal of uniform thickness. The grain of the metal in this strip 60 runs longitudinally thereof, and each of the segments is cut from the strip in such a way that the fingers 36 extend generally longitudinally of the strip 60, whereby the grain in each of the fingers runs generally longitudinally thereof. Thus, each finger has about the same characteristics of elasticity and extensibility as each of the other fingers of the clutch disc.

In addition to the advantage of having the grain of the metal run longitudinally in substantially the same manner for each of the fingers 36, punching the segments from a narrow strip also makes it possible to construct the clutch with only a small amount of waste, especially as compared with the amount of waste that would occur if the discs were cut or punched as an integral part from a strip of metal as wide as the overall diameter of the disc and fingers together. Further, the segments can be formed on a press smaller than the press that would be required to punch the entire disc at one stage.

According to the present invention, the segments are formed in two stages. First, the rivet holes 43, the holes 51 receiving the bushings, and the holes defining the space between the arms or fingers 36 and the body of the disc 35 are punched, as indicated in full lines in the right hand portion of Figure 3. Next, this portion of the stock is advanced to the left, and the segment is completed by punching out the remainder of the material, as shown in the left hand part of Figure 3. To perform both operations simultaneously, a first punch and die set is provided to form the rivet holes, the holes 51, and the holes defining the space between the fingers 36 and the body of the segment, and then another punch and die set is provided to punch out the remainder of the metal, thus completing the segment. Then, as is conventional practice, both punch and die sets are attached to the press in such a way that each operation of the press, after the feeding of the strip has been started and is continuous, punches the rivet holes and the other holes mentioned at the same time that the immediately preceding section is punched to complete the segment. The holes 43 may be drilled as a later operation, if desired. The holes 44 preferably are drilled, since they are of relatively small diameter, but they may be punched where feasible.

From the above description of the preferred embodiment of my invention, it will be apparent that I have provided a clutch in which the clutch disc is connected to the flywheel or other driving or driven part by means which transmits the full driving force but is exceedingly flexible and can accommodate axial, radial, or angular misalignment, or any combination of misalignments for transmitting the full load and without causing any parts of the clutch to slip or overheat. Further, the particular form of flexible connecting arms with which the present disc clutch is provided makes it possible to secure the requisite flexibility without overstressing the metal of the arms or the metal at the points where the arms join or connect to the clutch disc proper. Specifically, I secure the desired amount of flexibility by forming the attaching arms or fingers with arcuate sections so that the main body of the finger lies outwardly of a line connecting the outer end of the finger to the point of its attachment to the disc. The present invention also provides an improved clutch construction by dividing the clutch disc proper into a plurality of segments, which not only makes it possible to replace or renew the clutch surfaces without disassembling the driving and driven parts, but also it is possible to form the clutch segments on a smaller press, and thereby at less cost, and to have the grain of the metal run substantially the same way in each of the attaching fingers.

It is to be understood that my invention is not to be limited to the specific details shown and described above, but that, in fact, widely different means may be employed in the practice of the broader aspects of my invention.

What I claim, therefore, and desire to secure by Letters Patent is:

1. A clutch disc comprising a plurality of segmental sections and one or more generally circumferentially directed arcuate attaching fingers connected at one end to each segment, the other end being free, the radius of curvature of each finger being such that the principal portion of the body of the finger lies substantially entirely outside a line extending from the end of the finger to its connection with its respective segmental section.

2. A clutch disc as defined in claim 1 in which the attaching fingers are fixed at one end to the associated segment and the other or free end is apertured, and spacing bushings fixed to the free ends of said fingers, each bushing having a reduced end riveted in the aperture at the free end of the associated finger.

3. A clutch adapted to connet driving and driven parts, comprising a clutch disc consisting of a plurality of segmental members, each having at its periphery one or more generally circumferentially extending flexible arms, one of the arms of each segmental member being formed on an arcuate curvature of smaller radius than said segmental member, means fixing the free ends of said arms to one of said parts, and a pair of clutch plates carried by the other of said parts for clamping said segmental members therebetween.

4. A new article of manufacture comprising a clutch disc formed of a plurality of metallic segmental plates, the peripheral portion of each plate having one or more generally circumferentially extending arms, said arms being formed on an arcuate curvature of smaller radius than said segmental plates, each of said plates being formed so that the grain of the metal extends approximately in the same direction in all of the arms of the clutch disc.

5. A clutch disc comprising a plurality of segmental sections, each having one or more generally circumferentially directed arcuate attaching fingers integrally connected at one end to the associated section, each section being formed of sheet metal stock with the grain of the metal extending generally longitudinally in each attaching finger whereby the resilience of each finger is substantially the same as that of the other fingers.

6. A clutch disc having a plurality of arcuate attaching arms connected thereto at one end, the other end being free, the radius of curvature of each arm being such that the principal portion of the body of the arm lies wholly outside a line extending from the end of the arm to its connection to said disc.

7. A clutch disc comprising a plurality of segmental sections, each having a plurality of arcuate attaching arms connected thereto at one end, the other ends of said arms being free, the free end of each arm being apertured to receive attachment means and the aperture of each arm being disposed in a line substantially tangent to the disc at the point where the arm connects therewith.

8. A clutch disc as defined in claim 7 wherein the radially inner edge of each arm is curved from one end of the arm to the other and lies radially outwardly of said tangent line.

9. A clutch adapted to connect driving and driven parts, comprising a clutch disc having a plurality of resilient attaching arms, each connected at one end to the disc and extending generally circumferentially therefrom in the general plane thereof, a pair of clutch plates, one fixed to one of said parts and the other movable relative to the fixed clutch plate for clamping the clutch disc therebetween, and means for attaching the free ends of said resilient arms to the other part, said first clutch plate and said free ends of said arms being attached, respectively, to said parts at such points that when the clutch disc is clamped between the clutch plates said resilient arms are deflected out of their normal position and will move the clutch disc away from said fixed clutch plate when the other clutch plate is shifted to disengage the clutch.

10. A clutch to connect a flywheel and a driven shaft, comprising a pair of driven clutch plates carried by said driven shaft adjacent the plane of the outer edge of said flywheel, a driving clutch disc disposed between said plates and formed as separately removable segmental sections, flexible arms projecting from the outer peripheral portions of said segmental sections for separately connecting each segmental section to the outer edge of said flywheel, said arms being releasable from said flywheel to provide for the separate removal of said sections radially outwardly from between said plates alongside the outer edge of said flywheel, and means effective between adjacent segmental sections for limiting outward radial movement of one of said sections relatively to an adjoining section.

11. A clutch disc comprising a plurality of arcuate segmental parts having their adjacent edges extending substantially radially of the disc, said segmental parts being assembled in generally circular formation to form the clutch disc, circumferentially extending flexible arms projecting from the outer peripheral portions of said segmental parts for mounting said parts in the clutch, each segmental part having an apertured lug at the radially outer corners, and a link disposed in the apertures of adjacent lugs for holding said segmental parts in assembled relation.

12. A clutch to connect a flywheel and a driven shaft, comprising a pair of driven clutch plates carried by said driven shaft adjacent the plane of the outer edge of said fly wheel, a driving clutch disc disposed between said plates and formed as separately removable segmental sections, each of said segmental sections having a plurality of arcuate attaching arms connected thereto at one end, the other ends of said arms being free, the radius of curvature of each arm being such that the principal portion of the body of the arm lies wholly outside a line extending from the end of the arm to its connection to said segmental section, means separately connecting each attaching arm to the outer edge of said fly wheel, said means being removable to provide for the separate removal of said sections radially outwardly from between said plates alongside the outer edge of said flywheel; and means effective between adjacent segmental sections for limiting outward radial movement of one of said sections relatively to an adjoining section.

13. In a clutch adapted to connect two rotary members, the combination of a clutch disc carried by one of said rotary members and adapted to engage a cooperating clutch element carried by the other rotary member, said clutch disc comprising a plurality of segmental sections separately removable and replaceable in the clutch assembly, each of said segments comprising a plurality of attaching arms extending in a generally circumferential direction from the periphery of the segments, means for attaching said arms to one of said rotary members, and means establishing a tie connection between the adjoining edges of adjacent segments such as resists circumferential separating forces between the segments while permitting relative radial movement between the segments.

14. In a clutch adapted to connect two rotary members, the combination of a clutch disc carried by one of said rotary members and adapted to engage a cooperating clutch element carried by the other rotary member, said clutch disc comprising a plurality of segmental sections separately removable and replaceable in the clutch assembly, a plurality of flexible attaching arms for each segment joined at one end to the segments and having their free ends extending in a generally circumferential direction spaced outwardly from the periphery of the segment, means for attaching said free ends to one of said rotary members, and tie means extending between the adjoining edges of adjacent segments and disposed adjacent the peripheries of said segments inside the free ends of adjacent attaching arms, said tie means resisting circumferential separating forces acting between the segments while permitting relative radial movement between the segments.

15. In a clutch adapted to connect a flywheel and a driven shaft, the combination of a pair of driven clutch plates carried by said driven shaft adjacent the plane of the outer edge of said flywheel, a driving clutch disc disposed between said plates and adapted to be engaged thereby, said clutch disc being formed as a plurality of separately removable arcuate segments, said segments having their contiguous or meeting edges extending substantially radially of the disc, a pair of flexible attaching arms for each segment having their inner ends formed integrally with the segments and having their free ends extending in a generally circumferential direction spaced outwardly from the periphery of the segments, bolts securing said free ends to the outer edge of said flywheel, and tie means extending between the adjoining edges of adjacent segments and disposed adjacent the peripheries of said segments inside the free ends of adjacent attaching arms, said tie means increasing the hoop strength of the assembly of segments while permitting relative radial movement between the segments.

CLARENCE M. EASON.